US011720988B1

(12) United States Patent
Miranda et al.

(10) Patent No.: US 11,720,988 B1
(45) Date of Patent: Aug. 8, 2023

(54) AUTOMATED DATA AGENT MONITORING BOT

(71) Applicant: Wells Fargo Bank, N.A., San Francisco, CA (US)

(72) Inventors: Darius A. Miranda, San Francisco, CA (US); Rajiv Ranjan, Fremont, CA (US); Uma Meyyappan, Freemont, CA (US); Chris Theodore Kalaboukis, San Jose, CA (US); Joon Maeng, Newcastle, WA (US); Ramanathan Ramanathan, Bellevue, WA (US); Abhijit Rao, Irvine, CA (US); Abhijit Shetti, Pleasanton, CA (US); Rameshchandra Bhaskar Ketharaju, Hyderabad (IN); Chandramouli Subramanian, San Ramon, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 368 days.

(21) Appl. No.: 16/900,601

(22) Filed: Jun. 12, 2020

(51) Int. Cl.
  *G06Q 30/00* (2023.01)
  *G06Q 50/26* (2012.01)
  (Continued)

(52) U.S. Cl.
  CPC ......... *G06Q 50/265* (2013.01); *G06F 11/302* (2013.01); *G06F 11/3438* (2013.01);
  (Continued)

(58) Field of Classification Search
  None
  See application file for complete search history.

(56) References Cited

U.S. PATENT DOCUMENTS

| 41,657 A | * | 2/1864 | Webster | ............... E05C 19/003 |
| | | | | 292/259 R |
| 7,222,103 B2 | | 5/2007 | Sato et al. | |

(Continued)

FOREIGN PATENT DOCUMENTS

| EP | 926614 A2 | * | 6/1999 | ............. G06Q 30/02 |
| EP | 1463354 A1 | * | 9/2004 | ........... G08G 1/0104 |
| JP | 2020009474 A | * | 1/2020 | ............... G06N 5/02 |

OTHER PUBLICATIONS

Zach Naqvi. "Artificial Intelligence, Copyright, and Copyright Infringement." (2020). Retrieved online Aug. 9, 2022. https://scholarship.law.marquette.edu/cgi/viewcontent.cgi?article=1355&context=iplr (Year: 2020).*

(Continued)

*Primary Examiner* — James A Reagan
(74) *Attorney, Agent, or Firm* — Schwegman Lundberg & Woessner, P.A.

(57) ABSTRACT

Various examples are directed to computer-implemented systems and methods for providing an automated data agent monitoring bot. A method includes receiving, by a processor of a computer, input from a user requesting monitoring of user data generation and access on an application or website. The processor analyzes terms of service of the application or website where the user data is used or generated, and programs a monitoring bot configured to monitor the user data based on the terms of service and the received input. The monitoring bot tracks third-party access to the user data based on the terms of service, notifies the user regarding the tracked third-party access, and provides options to the user to control or monetize the tracked access to the user data.

20 Claims, 7 Drawing Sheets

(51) Int. Cl.
| | |
|---|---|
| *G06Q 10/10* | (2023.01) |
| *G06Q 50/18* | (2012.01) |
| *G06Q 20/12* | (2012.01) |
| *G06F 11/30* | (2006.01) |
| *G06F 11/34* | (2006.01) |
| *G06N 5/043* | (2023.01) |
| *H04L 67/146* | (2022.01) |
| *G06F 16/9537* | (2019.01) |
| *H04L 67/53* | (2022.01) |
| *H04L 67/50* | (2022.01) |
| *G06F 8/30* | (2018.01) |
| *G06Q 30/0601* | (2023.01) |

(52) U.S. Cl.
CPC ......... *G06F 16/9537* (2019.01); *G06N 5/043* (2013.01); *G06Q 10/10* (2013.01); *G06Q 20/1235* (2013.01); *G06Q 50/184* (2013.01); *H04L 67/146* (2013.01); *H04L 67/53* (2022.05); *H04L 67/535* (2022.05); *G06F 8/30* (2013.01); *G06Q 30/0607* (2013.01)

(56) References Cited

U.S. PATENT DOCUMENTS

| | | | |
|---|---|---|---|
| 7,672,879 B1 | 3/2010 | Kumar et al. | |
| 8,013,729 B2 | 9/2011 | Buehler | |
| 8,055,752 B1 | 11/2011 | Fong et al. | |
| 8,583,592 B2* | 11/2013 | Stading | G06F 16/9535 |
| | | | 707/602 |
| 8,584,232 B2* | 11/2013 | Kerschbaum | G06F 21/6218 |
| | | | 726/22 |
| 8,635,674 B2 | 1/2014 | Bhatia et al. | |
| 8,656,013 B2 | 2/2014 | He | |
| 9,069,853 B2* | 6/2015 | Stading | G06F 16/93 |
| 9,143,614 B2* | 9/2015 | Williams | H04M 3/2281 |
| 9,401,989 B2 | 7/2016 | Uba et al. | |
| 9,451,088 B2* | 9/2016 | Williams | H04M 3/5238 |
| 9,729,592 B2* | 8/2017 | Slayton | H04L 65/403 |
| 9,807,236 B2* | 10/2017 | Williams | H04M 3/5191 |
| 9,849,364 B2* | 12/2017 | Tran | G16H 50/30 |
| 9,977,827 B2* | 5/2018 | Stading | G06F 16/3325 |
| 10,096,033 B2* | 10/2018 | Heath | G06Q 30/02 |
| 10,102,546 B2* | 10/2018 | Heath | G06Q 30/0259 |
| 10,120,877 B2* | 11/2018 | Heath | G06Q 50/01 |
| 10,127,563 B2* | 11/2018 | Heath | G06Q 50/01 |
| 10,140,620 B2* | 11/2018 | Heath | G06Q 30/02 |
| 10,217,117 B2* | 2/2019 | Heath | G06Q 30/0241 |
| 10,931,724 B2* | 2/2021 | Unitt | H04L 67/56 |
| 10,956,255 B1* | 3/2021 | Al-Bahar | G06F 40/35 |
| 11,249,836 B2* | 2/2022 | Al-Bahar | G06F 11/0793 |
| 2008/0243784 A1* | 10/2008 | Stading | G06F 16/3325 |
| 2008/0243785 A1* | 10/2008 | Stading | G06F 16/9535 |
| 2008/0243786 A1* | 10/2008 | Stading | G06F 16/951 |
| 2008/0243787 A1* | 10/2008 | Stading | G06F 16/951 |
| 2008/0244429 A1* | 10/2008 | Stading | G06F 16/248 |
| | | | 707/E17.093 |
| 2008/0263650 A1* | 10/2008 | Kerschbaum | G06F 21/6218 |
| | | | 726/9 |
| 2011/0276396 A1* | 11/2011 | Rathod | G06Q 20/10 |
| | | | 707/706 |
| 2013/0073366 A1* | 3/2013 | Heath | G06Q 30/0261 |
| | | | 705/14.25 |
| 2013/0073387 A1* | 3/2013 | Heath | G06Q 30/02 |
| | | | 705/14.53 |
| 2013/0073389 A1* | 3/2013 | Heath | G06Q 30/02 |
| | | | 705/14.54 |
| 2013/0073400 A1* | 3/2013 | Heath | G06Q 50/01 |
| | | | 715/738 |
| 2013/0073473 A1* | 3/2013 | Heath | G06Q 30/0241 |
| | | | 705/319 |
| 2014/0098949 A1* | 4/2014 | Williams | G06Q 10/02 |
| | | | 379/265.09 |
| 2014/0129942 A1* | 5/2014 | Rathod | H04N 21/44226 |
| | | | 715/720 |
| 2014/0173643 A1 | 6/2014 | Bhatia et al. | |
| 2015/0112963 A1* | 4/2015 | Mojtahedi | G06F 16/9537 |
| | | | 707/711 |
| 2015/0215350 A1* | 7/2015 | Slayton | G06F 9/453 |
| | | | 709/204 |
| 2015/0371023 A1 | 12/2015 | Chen et al. | |
| 2016/0021252 A1* | 1/2016 | Williams | H04M 3/5231 |
| | | | 379/265.11 |
| 2017/0134579 A1* | 5/2017 | Williams | H04M 3/5231 |
| 2017/0232300 A1* | 8/2017 | Tran | A63B 71/06 |
| | | | 434/247 |
| 2018/0078843 A1* | 3/2018 | Tran | G09B 19/0038 |
| 2019/0028587 A1* | 1/2019 | Unitt | G06F 9/453 |
| 2019/0260879 A1* | 8/2019 | Raleigh | H04M 15/83 |
| 2020/0193018 A1* | 6/2020 | Van Dyke | G06F 21/552 |
| 2020/0302521 A1* | 9/2020 | Wernikoff | G06Q 40/00 |
| 2021/0042408 A1* | 2/2021 | Van Dyke | G06F 21/552 |
| 2021/0176286 A1* | 6/2021 | Unitt | H04L 67/01 |
| 2021/0334155 A1* | 10/2021 | Al-Bahar | G06N 3/006 |
| 2021/0334156 A1* | 10/2021 | Al-Bahar | G06F 40/35 |

OTHER PUBLICATIONS

FTC. "Fighting Identity Theft with the Red Flags Rule: A How-To Guide for Business." (May 2, 2013). Retrieved online Nov. 20, 2022. https://www.ftc.gov/business-guidance/resources/fighting-identity-theft-red-flags-rule-how-guide-business (Year: 2013).*

Wells-Fargo. "How We Protect You." (Dec. 10, 2013). Retrieved online Nov. 20, 2022. https://www.wellsfargo.com/privacy-security/fraud/protecting-you/ (Year: 2013).*

"Application Analytics", appDynamics, [Online], Retrieved from the Internet: <URL: https://www.appdynamics.com/product/how-it-works/application-analytics>, (Feb. 27, 2016), 11 pgs.

"Data Dog User Agent String", Distil Networks, [Online]. Retrieved from the Internet: <URL: https://www.distilnetworks.com/bot-directory/bot/data-dog/>, (Nov. 17, 2016), 2 pgs.

"How to monitor and improve your app using data!", FinExtra, [Online], Retrieved from the Internet: <URL: https://www.finextra.com/blogposting/12861/how-to-monitor-and-improve-your-app-using-data>, (Jul. 15, 2016), 6 pgs.

* cited by examiner

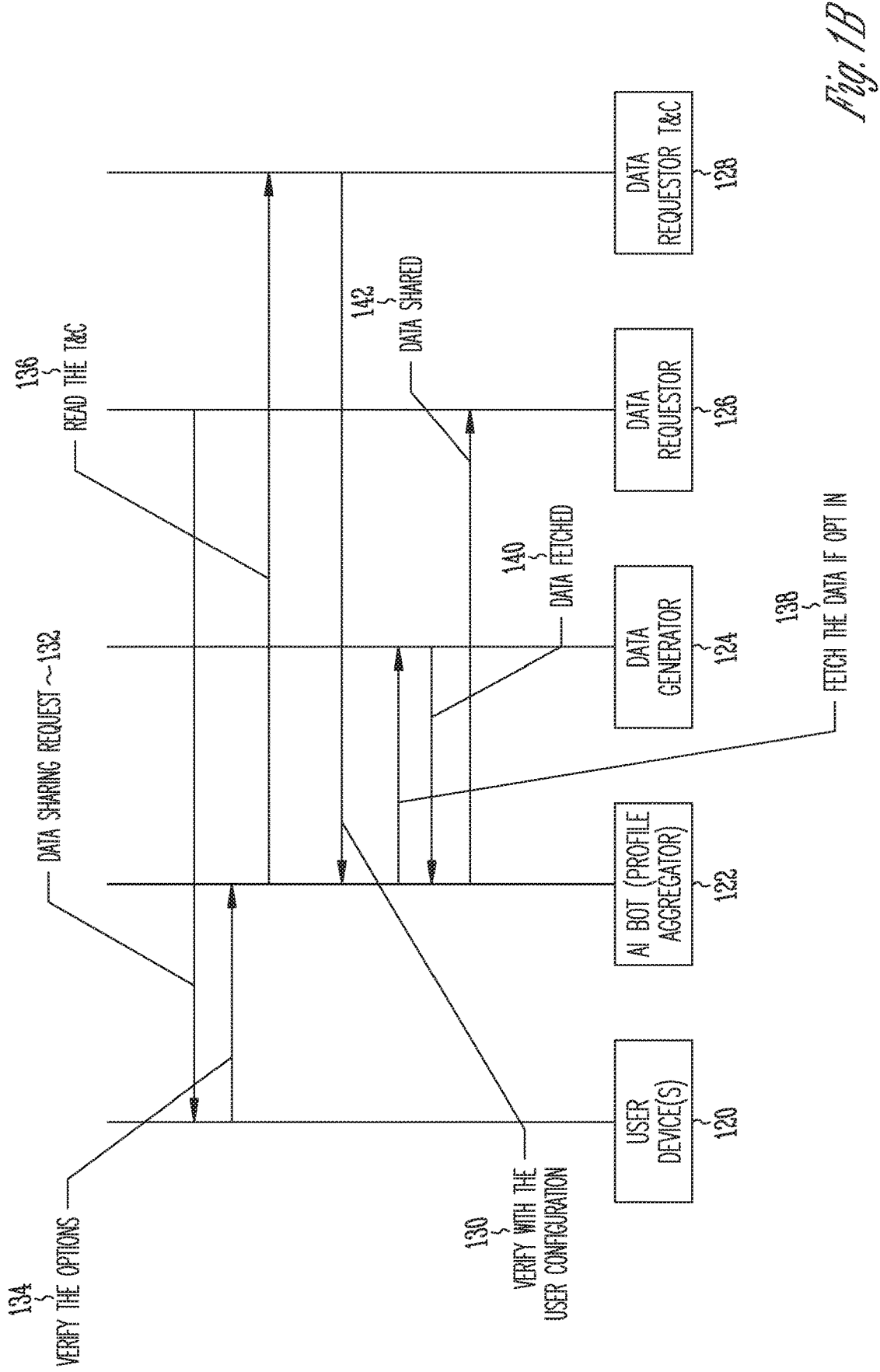

AUTOMATED DATA AGENT MONITORING BOT

TECHNICAL FIELD

Embodiments described herein generally relate to automated data monitoring and, for example and without limitation, to systems and methods for an automated data agent monitoring bot.

BACKGROUND

A user of online services may encounter situations in which it would be desirable to monitor or monetize data generated by the user. The user would also benefit from being able to track their generated data and use of the generated data by third parties, as well as terms of service of applications or websites where the data is used or generated.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not of limitation, in the figures of the accompanying drawings, in which:

FIGS. 1A-1B illustrate example embodiments of methods for providing an automated data agent monitoring bot;

DETAILED DESCRIPTION

The present subject matter provides a system and method for providing an automated data agent monitoring bot (or "monitoring bot"). The monitoring bot may be used to notify a user when data is created, and further notify the user of how the data is being used under terms of service of a website or application the user is currently or formerly using to generate or use data. The bot may be configured to monitor a user's actions and to let the user know that the user is potentially creating interesting data. Based on the terms of use of the website or application, the monitoring bot may notify the user that the user is potentially generating data that can be used by the website or application. The monitoring bot may actively monitor the user's actions to determine what the user is giving away with respect to the user's rights to the generated data. The monitoring bot may also determine what actions the user might be able to take to protect the data. For example, the monitoring bot may direct the user to an anonymous browser, to opt out of certain terms or service, to have the terms changed, or to cease actions on the application or website. The monitoring bot may also determine monetization options for the data, and may determine if a personal whitelist action or websites that collect the user's data is being accessed.

Figure 1A:
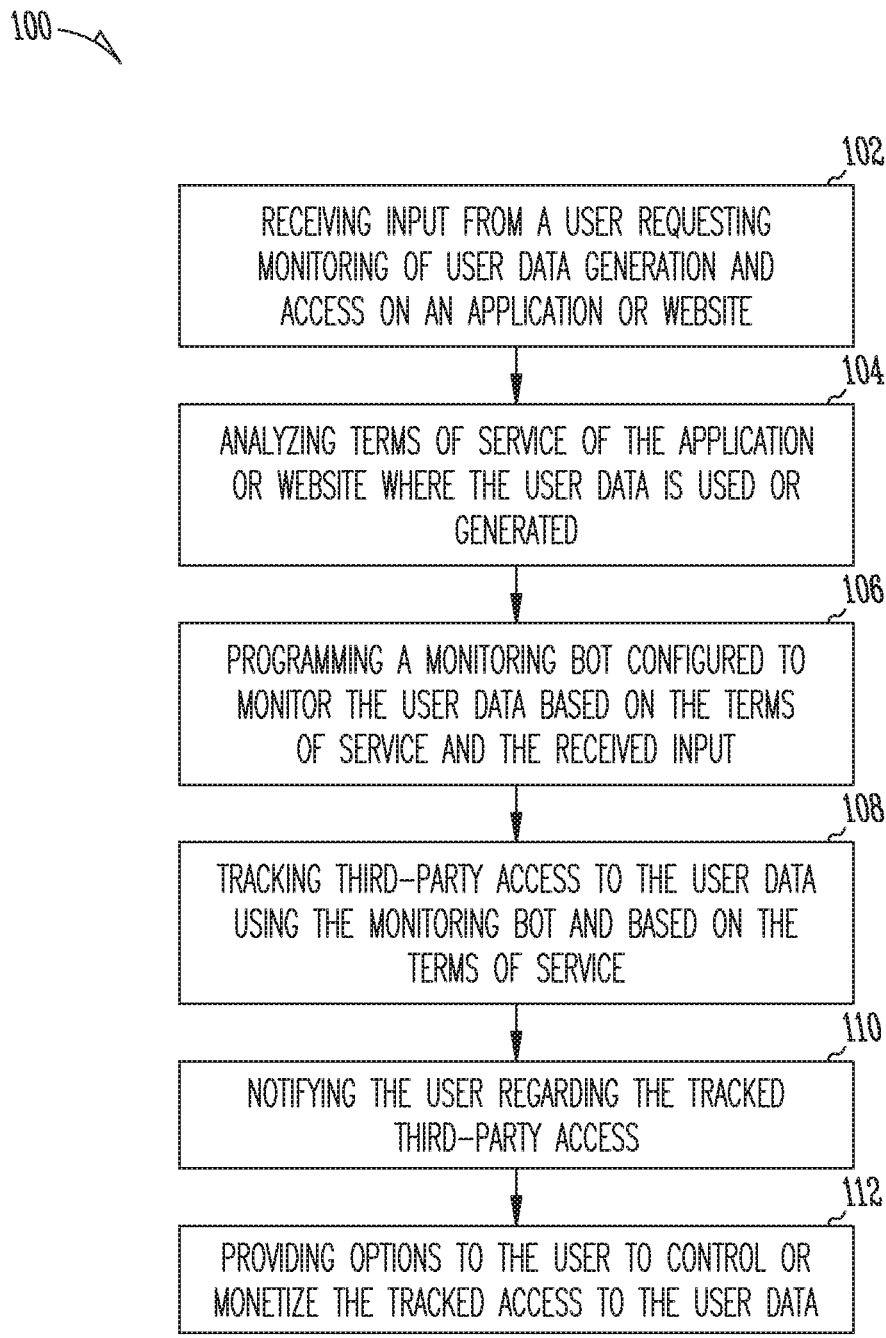

FIG. 1A illustrates an example embodiment of a method for providing an automated data agent monitoring bot. The method 100 includes receiving, by a processor of a computer, input from a user requesting monitoring of user data generation and access on an application or website, at operation 102. At operation 104, the processor analyzes terms of service of the application or website where the user data is used or generated, and, at operation 106, programs a monitoring bot configured to monitor the user data based on the terms of service and the received input. At operation 108, the monitoring bot tracks third-party access to the user data based on the terms of service, and, at operation 110, notifies the user regarding the tracked third-party access. At operation 112, the monitoring bot provides options to the user to control or monetize the tracked access to the user data.

In various embodiments, the monitoring bot includes a search tool configured to provide users with locations where the user data is being used or stored. The monitoring bot includes a data tracking advisor configured to provide the user with an alert when the user data is transferred to an entity flagged by the user, in some embodiments. According to various embodiments, the monitoring bot includes a trend watching alert configured to provide a mechanism for users to create and monetize data in real-time. The monitoring bot is configured to notify the user of the terms of service at a time when the user data is created, in various embodiments. In some embodiments, the monitoring bot is configured to track third-party access to the user data during a window of time selected by the user or the monitoring bot. According to various embodiments, the monitoring bot is configured to run a script inside a sandbox, monitor how a third-party is using the user data, and send a notification to the user regarding how the third-party is using the user data. The monitoring bot is configured to monitor copyrighted data to calculate licensing income for the user, in various embodiments. In some embodiments, the monitoring bot is an add-on to a robo-advisor bot.

The present subject matter provides monitoring of user data to ensure a user is aware of how the user's generated data is used. In some embodiments, when a third-party wants to use data, the third-party agrees to be monitored in specific circumstances. A monitoring bot runs script inside a sandbox, monitors how the receiver of the data is using the data, and sends info back to owner of the data (this is how your data was used, etc.) in various embodiments. In one example, data use is monitored for licensing software, to provide for monetization of the data use. In another example, data use is monitored for copyright enforcement, where a user agrees to certain fair use, monitoring and monetizing of the data. A software platform is provided for the monitoring bot, in various embodiments. In some embodiments, the user-generated data has contracts embedded within, and the platform enforces the contracts.

According to various embodiments, the monitoring bot may be an add-on to a robo-advisor bot. The monitoring bot includes a data swiper in some embodiments, and the data swiper (or sniffer) determines what is being done with the user-generated data. In various embodiments, analytics are provided on top of the data swiper to determine how the user is interacting with different systems. Various embodiments include a search tool for users to see their own data plus use, including background collection then aggregation or a searchable tool for identifying the user's data use. In various embodiments, the bot actively searches to see where data is being used or stored (as available), and informs the user where and how the data is being used.

Various embodiments of the monitoring bot include a data tracking advisor to track how user-generated data is shared and alert the user when data is to be transferred somewhere the user may not want the generated data to be located. The monitoring bot alerts the user to where inferences about the user might be being made by a particular website or entity, in some embodiments. For example, when a user applies for a job, the monitoring bot may flag the user's resume to make sure it does not get transferred to a location where the user's current employer might see the resume.

Various embodiments of the monitoring bot include a trend watching alert that provides for a user to create and monetize data in real-time. The monitoring bot scans for data demand (from search queries), and notifies the user to create data based on the user's capabilities, in various embodiments. When data is being created by a user, the monitoring bot provides visibility to the user into the terms of service of the site or application where the data is created, informing the user if giving away data, or violating the terms, etc.

In some embodiments, the monitoring bot provides for selection of a window of time to analyze data using selection criteria. The monitoring bot may analyze the data, pick a window, and pick a selection criterion—for example a distribution curve—based on amount of data incoming for the monitoring bot to monitor, in various embodiments. Because the terms of use of an application or website may change, the monitoring bot may include a parser for the terms of service (or terms of use), to show the user what has changed and how it affects the user, in various embodiments. The monitoring bot may communicate the changes to the user and tell the user how the changes can affect previously generated user data in an easy-to-understand format, in various embodiments. The monitoring bot is configured for use with a retail user's data, in various embodiments. In various embodiments, the monitoring bot relies on an interaction of the user with a particular site or application, and determines how that particular site or application is using the data.

In various embodiments, the monitoring bot monitors a user's actions online and alerts the user to the creation of data, notifying the user of potential to monetize or limit the use of the created or generated data. A user agrees to be monitored, in various embodiments. In some embodiments, the automated bot is configured to run on an external server, user device, and/or other computer processor in communication with the user device. According to various embodiments, the monitoring bot runs a script in a sandbox, or restricted operating environment, to monitor how user-generated data is used and to send information regarding the data use back to the owner or creator of the data.

The monitoring bot can reside on one or more or all user devices, in various embodiments, and determines if actions by the user or third-parties threatens the value of the user-generated data. In various embodiments, the monitoring bot provides a report to the user upon detection of a threatening action, upon a programmable schedule, or periodically. The monitoring bot creates a buffer to protect the data from actions that access or change the user-generated data, in some embodiments. For example, if an entity or third-party attempts to transfer the data to a questionable website, the monitoring bot may block the transaction to prevent scams or unauthorized use of the data. The monitoring bot may monitor all user interactions with selected websites and applications, in various embodiments. The monitoring bot creates storage to record the actions (by the user, the third-party, an application, and/or a website) that relate to the user-generated data, in some embodiments. If user-generated data is used in a manner in which the user may monetize the use, the monitoring bot notifies the user and provides options to obtain compensation for such use, in various embodiments discussed below.

A plurality of monitoring bots may be used to monitor the creation and use of a single user's data, in various embodiments. The monitoring bot may use artificial intelligence (AI) to learn how a user generates data and how the data is subsequently used by a program, an application, and/or third-parties, in various embodiments. The monitoring bot collects information about the third-parties, in some embodiments. In various embodiments, the third-parties agree to be monitored as a prerequisite to using the data generated by the user. The monitoring bot encrypts the user-generated data, in various embodiments. A creator of the monitoring bot may retain a portion of the monetization as a fee charged to the user for using the monitoring bot services, in various embodiments.

In various embodiments, the monitoring bot interacts with a data jurisdiction bot to establish controls to protect the interest of the creator of the data. The monitoring bot may assess the terms and conditions of the cookies that request the data for specific usage, in various embodiments. In some embodiments, the monitoring bot may be an artificial intelligence (AI) bot that may analyze a potential opportunity for the data that is requested by a cookie. In some embodiments, the monitoring by may recommend the opportunities to a data jurisdiction bot that then recommends controls to the creator of the data. The monitoring bot may assess the opportunity of sustaining and evolving the data for the benefit of use and alert the user of the possibility for depreciation of the data that is tending toward perishable data, in some embodiments. In various embodiments, the monitoring bot may provide a Control Recommendation Engine Assessing Monetization (CREAM) opportunity after interacting with a cookie or browser. A CREAM system may be an AI system for assessing the possible opportunities of data sustenance and evolution from monetization opportunities, in various embodiments. The monitoring bot may communicate this information to the data jurisdiction bot, in some embodiments, thus acting as a broker between the cookie and the data jurisdiction bot in providing the CREAM service.

Various embodiments of the present subject matter include a system for providing an automated data agent monitoring bot. The system includes a computing device comprising at least one processor and a data storage device in communication with the at least one processor. The data storage device includes instructions thereon that, when executed by the at least one processor, causes the at least one processor to receive input from a user requesting monitoring of user data generation and access on an application or website, and to analyze terms of service of the application or website where the user data is used or generated. A monitoring bot is programmed and configured to monitor the user data based on the terms of service and the received input, to track third-party access to the user data based on the terms of service, to notify the user regarding the tracked third-party access, and to provide options to the user to control or monetize the tracked access to the user data.

According to some embodiments, the monitoring bot is configured to access terms and conditions of cookies that request the user data for a specific usage. The monitoring bot is an AI bot capable of identifying and analyzing potential monetization opportunities for the user data, in some embodiments. In various embodiments, the monitoring bot is configured to alert the user if a value of the data is depreciating below a programmable threshold as discussed below. The monitoring bot is configured to interact with a data jurisdiction bot to establish controls to protect the interests of the user with respect to the user data, in various embodiments.

In various embodiments, a non-transitory computer-readable storage medium is provided. The computer-readable storage medium includes instructions that when executed by computers, cause the computers to perform operations of receiving input from a user requesting monitoring of user data generation and access on an application or website, analyzing terms of service of the application or website where the user data is used or generated, and programming a monitoring bot configured to monitor the user data based on the terms of service and the received input. Further operations include tracking third-party access to the user data using the monitoring bot and based on the terms of service, notifying the user regarding the tracked third-party access, and providing options to the user to control or monetize the tracked access to the user data.

According to various embodiments, the monitoring bot is configured to be replicated on multiple devices used by the user. In some embodiments, the multiple devices may include a smartphone, a tablet, or a laptop. Other devices may be used without departing from the scope of the present subject matter.

Figure 2A:
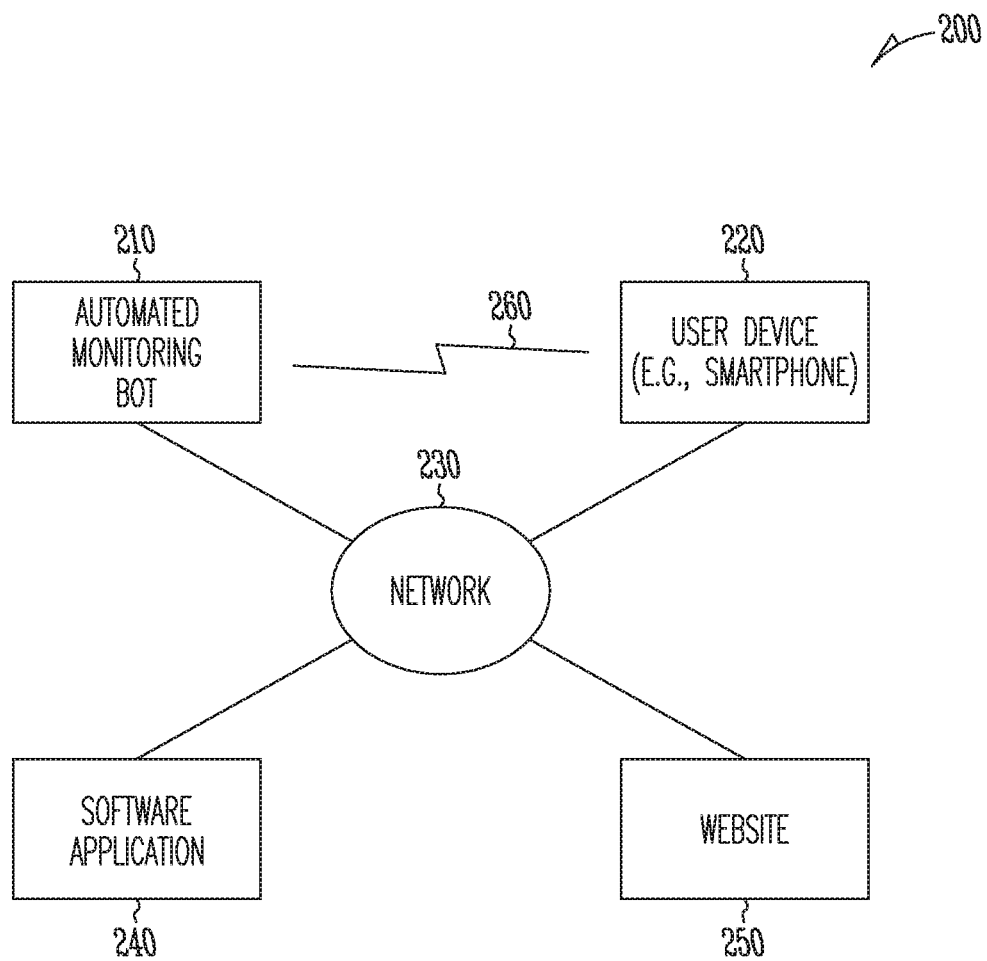
FIGS. 2A-2B illustrate exemplary infrastructure for providing an automated data agent monitoring bot.

FIG. 2A illustrates an exemplary infrastructure for providing an automated data agent monitoring bot. The infrastructure may comprise a monitoring bot 210, a user device (e.g., mobile device such as a smartphone or wearable device) 220, a software application 240, and a website 250, a network 230, and a local network 260. The user device 220 may be a mobile computing device such as smartphone, tablet computer, or other portable computing device. Exemplary mobile devices include the Apple iPhone and Samsung Galaxy smartphone. The software application 240 and website 250 may be any such application or website where user data may be generated by the user or accessed by a third-party.

The network 230 represents a virtual network that provides communication between entities 210, 220, 240 and 250. The network 230 may comprise Internet, LAN, Wi-Fi, home network, cellular network, NFC, and other types of networks, in various embodiments. The local network 260 may be a wireless communication network between the user device 220 and automated monitoring bot 210 only. Exemplary local networks 260 are a Local area network (LAN) and a Personal Area Network (PAN). The local network 260 may use Bluetooth, Near Field Communication (NFC), Wi-Fi, ZigBee, or other wireless technology, in various embodiments.

Figure 2B:
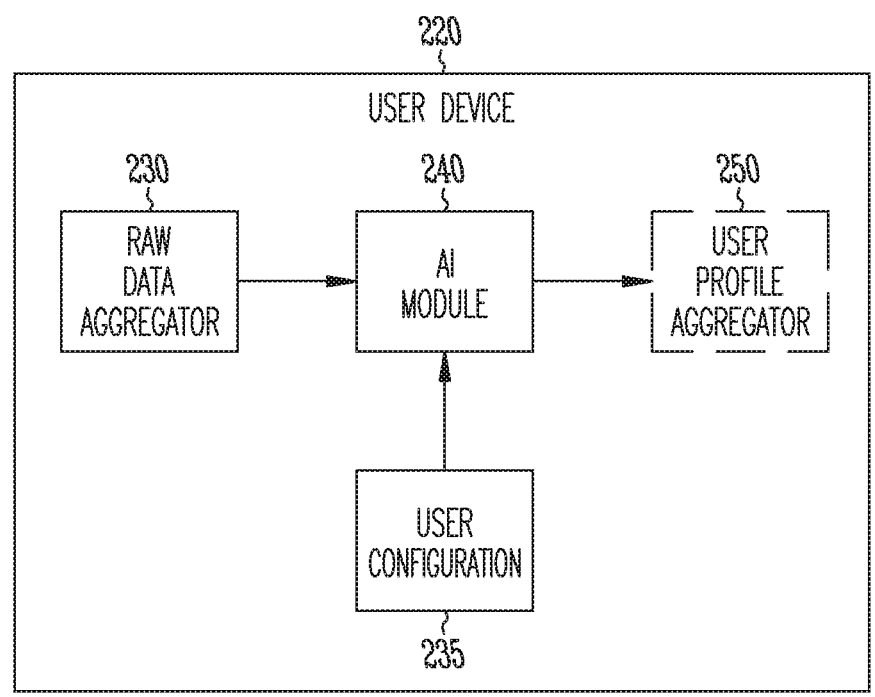

FIG. 2B illustrates an embodiment of a user device 220. The user device 220 may include a raw data aggregator 230 having an output that feeds into an artificial intelligence (AI) module 240 which consolidates raw data based on the user configuration 235 (opt-in, opt-out and/or alert user) to generate information, insights, records, trends, documents, and/or statistics of the user. In various embodiments, a user profile aggregator 250 fetches the output of the all the AI modules in various user device's (this could include family member device's too). The user profile aggregator 250 may reside on one of the user devices or a standalone private machine (e.g., AI Bot), in various embodiments.

In various embodiments, whenever raw data is to be generated, it would point out to the AI Bot which takes the decisions based on the user configuration and the terms and conditions of the third party (the web sites, applications, government, etc.) where the data is either generated or used. A user may opt-in or opt-out of data monitoring, in various embodiments. If the user configuration 235 permits the user to opt-in then the AI Bot would provide the access to the user profile aggregator 250 in a form of a token (could be a smart contract, cookie, counter, etc.), in various embodiments. In the case of opt-out configuration selection by the user, the AI Bot would only allow the raw data to be sent with the data governance and regulations, which preempts the third party to construct the user profile. In such case the data would be for one time use (OTU) and would not be stored in the third party data base, and would be erased from the in process memory after use.

In various embodiments, the present system can provide an alert operation. In the case of an alert configuration, the AI Bot would provide an alert to the user providing the scenarios where negotiation could happen with the second and third party. If the negotiations are fruitful then the alert would become an opt-in, otherwise the user could opt-out.

In the case of data usage, the AI Bot interacts with the third party data portal and obtains read-only access to the shared data portal. In various embodiments with natural language processing (NLP) and optical character recognition (OCR) modules, the AI Bot can recreate data in an in-process memory. Once the data is created in the in-process memory, the AI Bot may investigate the influence of the user profile aggregated data at various levels including user level device level, family member level, GPS location, and/or purchase patterns across various levels, etc. Once the AI Bot determines the influence of the shared data (information level), then it may look at the options of opt-in and opt-out, in various embodiments. This method may be deployed to the opt-in data on a periodical basis and if the influence is increasing then alert the user to re-negotiate contract/terms and conditions and provide opportunity to the user to continue with the new terms and conditions or to opt-out, in an embodiment. This option may be provided to the third party as well, in various embodiments.

In various embodiments, the present system can be used to monetize user data. FIG. 1B illustrates an example embodiment of a method for providing an automated data agent monitoring bot to monetize user data. In the case of the opt-in data, the data is monetized using the monetization rules where the user can sell or trade the data for a value (could be monitored using a smart contract, cookie, etc.), and may be available per use, one time, per information, per device, etc. The depicted process includes the AI Bot 122 verifying the user configurations 130 of the user device 120, and interfacing with the data generator 124, data requestor 126, and data requestor terms and conditions (T&C) 128. In various embodiments, the AI Bot 122 identifies data sharing requests 132, verifies the options 134, reads the terms and conditions 136, fetches the data 140 if the user has selected opt in 138, and controls data shared 142.

Figure 3:
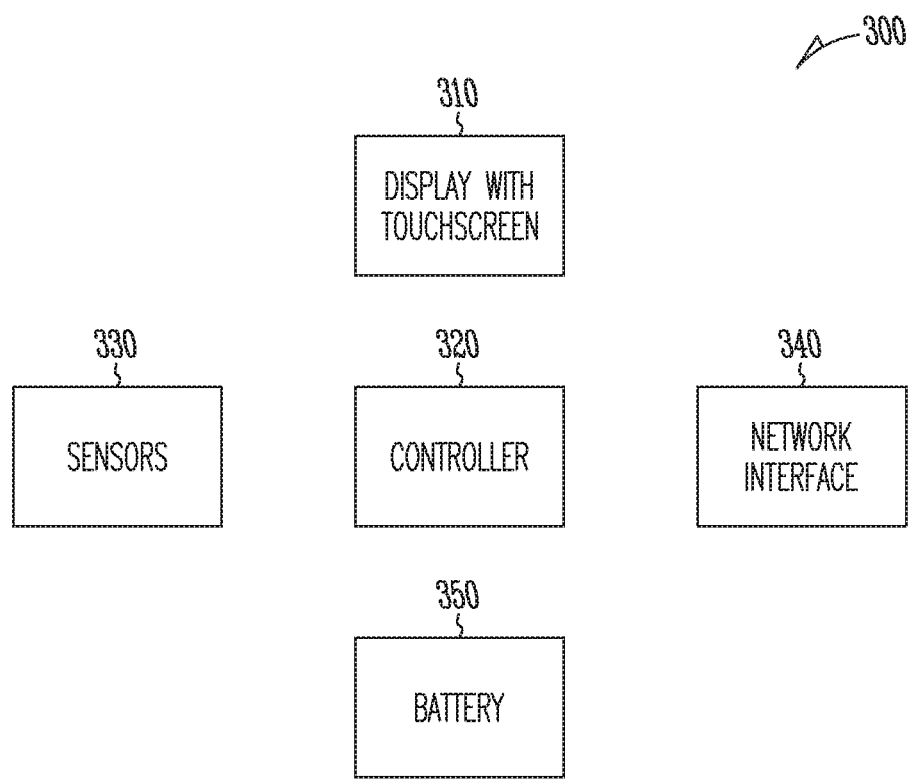
FIG. 3 illustrates an example embodiment of a computing device used by a user.

FIG. 3 illustrates an embodiment of computing device 300 used by a user to generate or use data. In the depicted embodiment, the computing device 300 includes a display with a touchscreen 310 interfaced with a controller or processor 320. The controller or processor 320 is electrically connected to one or more sensors 330, a network interface 340, and a battery 350 to supply power to the computing device 300, in various embodiments. FIG. 3 is merely a non-limiting example of a computing device and many other devices may be used to facilitate the functionality described herein.

Figure 4:
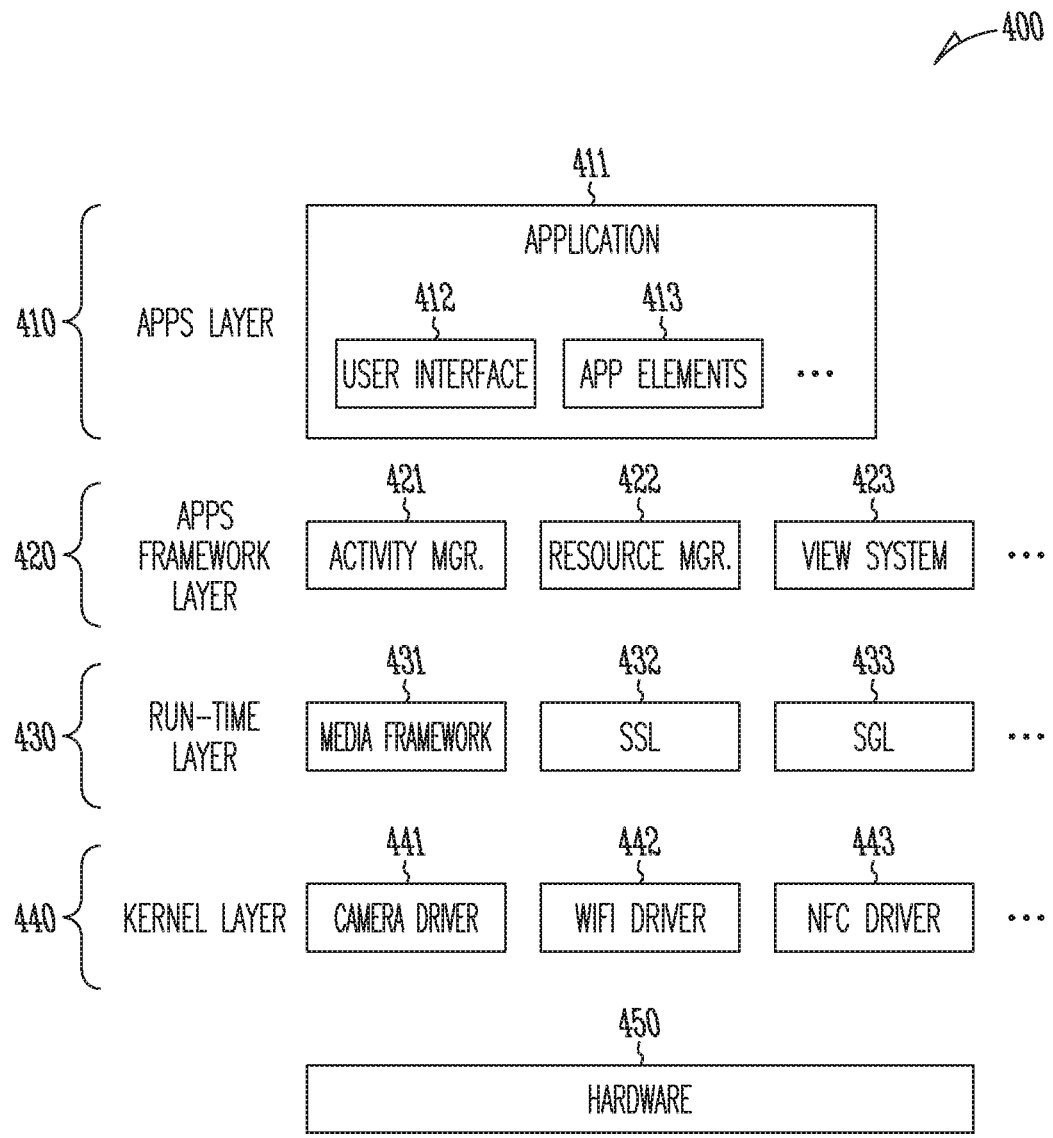
FIG. 4 illustrates an example embodiment of a computing device used for an automated data agent monitoring bot.

FIG. 4 illustrates an embodiment of a computing device 400 with a software application 411. In various embodiments, the computing device 400 includes a mobile computing device such as a cellular telephone or smart phone. The depicted embodiment illustrates one example of software architecture executed on hardware 450, including one or more processors of the computing device 400. FIG. 4 is merely a non-limiting example of a software architecture and many other architectures may be implemented to facilitate the functionality described herein.

The representative hardware 450 comprises one or more processing units having associated executable instructions. Executable instructions represent the executable instructions of the software architecture, including implementation of the methods, modules, and components of the present subject matter. Hardware 450 also includes memory and/or storage modules, which also have executable instructions.

In the example architecture of FIG. 4, the software may be conceptualized as a stack of layers where each layer provides particular functionality. For example, the software may include layers such as an operating system, libraries, frameworks/middleware, applications and presentation layer. Other software architectures may include additional or different layers. The operating system may manage hardware resources and provide common services. The overall system may include, for example, a kernel layer 440, run-time layer 430, application framework layer 420 and application layer 410. The kernel layer 440 may act as an abstraction layer between the hardware and the other software layers. For example, the kernel layer 440 may be responsible for memory management, processor management (e.g., scheduling), component management, networking, security settings, and so on. The drivers may be responsible for controlling or interfacing with the underlying hardware. For instance, the drivers may include display drivers, camera drivers 441, Bluetooth® drivers, flash memory drivers, serial communication drivers (e.g., Universal Serial Bus (USB) drivers), Wi-Fi® drivers 442, near field communication (NFC) drivers 443, audio drivers, power management drivers, and so forth depending on the hardware configuration.

The run-time layer 430 may include a media framework 431, a secure sockets layer (SSL) 432 and a secure group layer (SGL) 433, in various embodiments. The application framework layer 420 may include an activity manager 421, a resource manager 422, and a view system application 423, in various embodiments. The application layer 410 may include built-in applications and/or third-party applications. Examples of representative built-in applications may include, but are not limited to, a contacts application, a browser application, a book reader application, a location application, a media application, a messaging application, and/or a game application. Third-party applications may include any of the built-in applications as well as a broad assortment of other applications. In a specific example, the third-party application (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party application may invoke application programming interface (API) calls provided by the operating system to facilitate functionality described herein. A software application 411 may implement the functionality of an automated data agent monitoring bot, in one embodiment. The automated data agent monitoring bot may be provided by a built-in or third-party application, which may include a user interface 412 and application elements 413 in various embodiments.

The applications in application layer 410 may utilize built in operating system functions (e.g., kernel, services and/or drivers), libraries, frameworks and middleware to create user interfaces to interact with users of the system. Alternatively, or additionally, in some systems interactions with a user may occur through a presentation layer. In these systems, the application/module "logic" may be separated from the aspects of the application/module that interact with a user.

Figure 5:
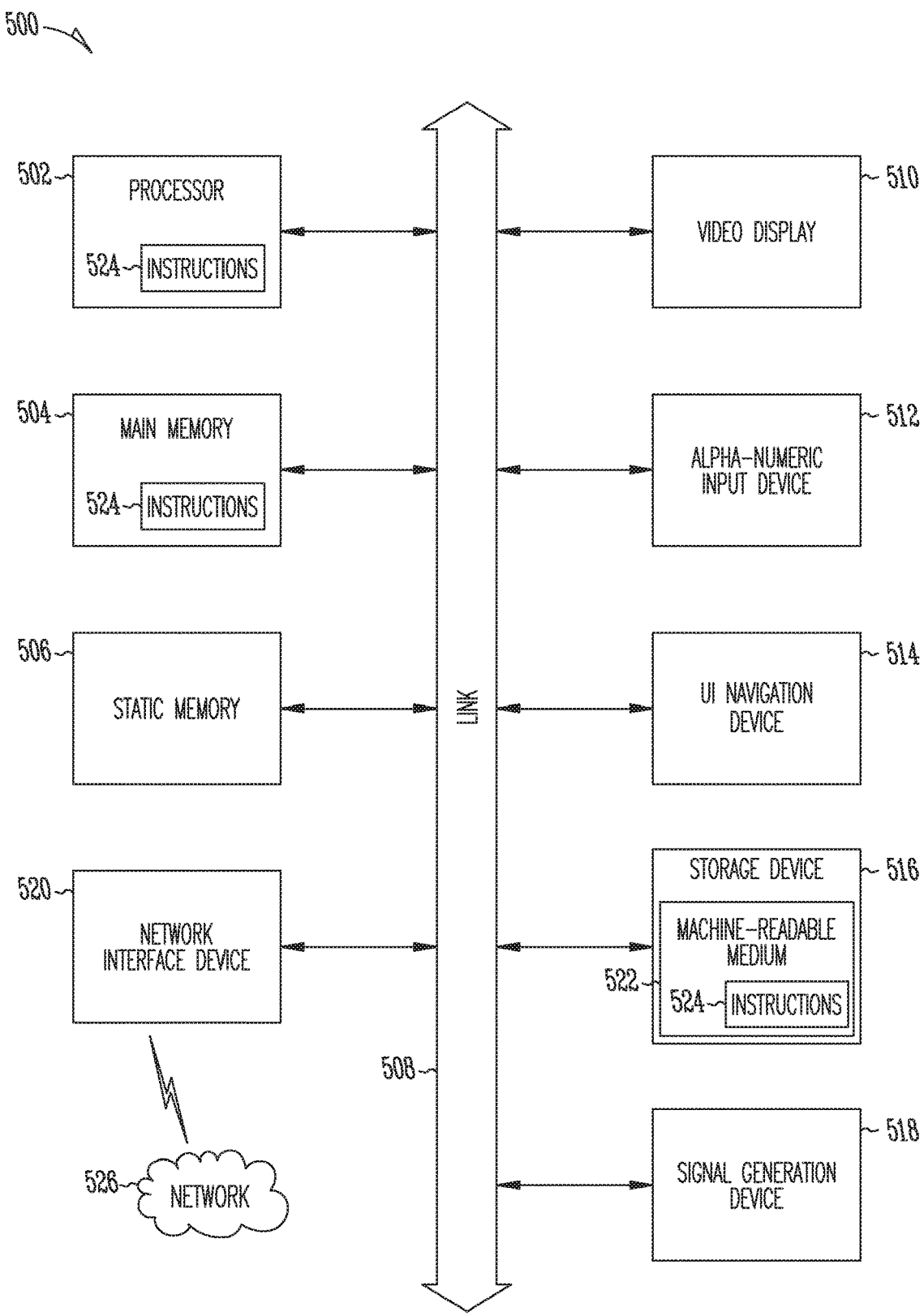
FIG. 5 is a block diagram of a machine in the example form of a computer system within which a set of instructions may be executed, for causing the machine to perform any one or more of the methodologies discussed herein.

FIG. 5 is a block diagram illustrating a machine in the example form of a computer system 500, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a personal computer (PC), a tablet PC, a hybrid tablet, a set-top box (STB), a personal digital assistant (PDA), a mobile or cellular telephone such as a smart phone, a wearable device such as a smart watch, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 500 includes at least one processor 502 (e.g., a central processing unit (CPU), a graphics processing unit (GPU) or both, processor cores, compute nodes, etc.), a main memory 504 and a static memory 506, which communicate with each other via a link 508 (e.g., bus). The computer system 500 may further include a video display unit 510, an alphanumeric input device 512 (e.g., a keyboard), and a user interface (UI) navigation device 514 (e.g., a mouse). In one embodiment, the video display unit 510, input device 512 and UI navigation device 514 are incorporated into a touch screen display. The computer system 500 may additionally include a storage device 516 (e.g., a drive unit), a signal generation device 518 (e.g., a speaker), a network interface device 520, and one or more sensors (not shown), such as a global positioning system (GPS) sensor, compass, accelerometer, or other sensor.

The data storage device 516 includes a machine-readable medium 522 on which is stored one or more sets of data structures and instructions 524 (e.g., software) embodying or utilized by any one or more of the methodologies or functions described herein. The instructions 524 may include a machine learning system or algorithm, and may also reside, completely or at least partially, within the main memory 504, static memory 506, and/or within the processor 502 during execution thereof by the computer system 500, with the main memory 504, static memory 506, and the processor 502 also constituting machine-readable media.

While the non-transitory computer-readable storage medium 522 is illustrated in an example embodiment to be a single medium, the term "machine-readable medium" or "computer-readable medium" may include a single medium or multiple media (e.g., a centralized or distributed database, and/or associated caches and servers) that store the one or more instructions 524. The term "machine-readable medium" shall also be taken to include any tangible medium that is capable of storing, encoding or carrying instructions (e.g., instructions 524) for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of well-known transfer protocols (e.g., HTTP). Examples of communication networks include a local area network (LAN), a wide area network (WAN), the Internet, mobile telephone networks, plain old telephone system (POTS) networks, and wireless data networks (e.g., Wi-Fi, 3G, and 6G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims.

Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A computer-implemented method comprising:
   receiving, by a processor of a computer, input from a user requesting monitoring of user data generated by activity of the user on an application or website;
   analyzing, by the processor, terms of service of the application or website where the user data is used or generated;
   programming, by the processor, a monitoring bot configured to monitor the user data based on the terms of service and the received input;
   encrypting, by the processor, the user data using the monitoring bot;
   tracking, by the processor, third-party attempt to access the user data using the monitoring bot and based on the terms of service;
   notifying, by the processor, the user regarding the tracked third-party attempt to access the encrypted data; and
   providing, by the processor, options to the user to monetize the tracked access to the user data.

2. The method of claim 1, wherein the monitoring bot includes a search tool configured to provide users with locations where the user data is being used or stored.

3. The method of claim 1, wherein the monitoring bot includes a data tracking advisor configured to provide the user with an alert when the user data is transferred to an entity flagged by the user.

4. The method of claim 1, wherein the monitoring bot includes a trend watching alert configured to provide a mechanism for users to create and monetize data in real-time.

5. The method of claim 1, wherein the monitoring bot is configured to notify the user of the terms of service at a time when the user data is created.

6. The method of claim 1, wherein the monitoring bot is configured to track third-party access to the user data during a window of time selected by the user.

7. The method of claim 1, wherein the monitoring bot is configured to track third-party access to the user data during a window of time selected by the monitoring bot.

8. The method of claim 1, wherein the monitoring bot is configured to:
   run a script inside a sandbox;
   monitor how the third-party is using the user data; and
   send a notification to the user regarding how the third-party is using the user data.

9. The method of claim 1, wherein the monitoring bot is configured to monitor copyrighted data to calculate licensing income for the user.

10. The method of claim 1, wherein the monitoring bot is an add-on to a robo-advisor bot.

11. A system comprising:
   a computing device comprising at least one processor and a data storage device in communication with the at least one processor, wherein the data storage device comprises instructions thereon that, when executed by the at least one processor, causes the at least one processor to:
   receive input from a user requesting monitoring of user data generated by activity of the user on an application or website;
   analyze terms of service of the application or website where the user data is used or generated;
   program a monitoring bot configured to monitor the user data based on the terms of service and the received input;
   encrypt the user data using the monitoring bot;
   track third-party attempt to access the user data using the monitoring bot and based on the terms of service;
   notify the user regarding the tracked third-party attempt to access the encrypted data; and
   provide options to the user to monetize the tracked access to the user data.

12. The system of claim 11, wherein the monitoring bot is configured to access terms and conditions of cookies that request the user data for a specific usage.

13. The system of claim 11, wherein the monitoring bot is an artificial intelligence bot capable of identifying and analyzing potential monetization opportunities for the user data.

14. The system of claim 11, wherein the monitoring bot is configured to alert the user if a value of the data is depreciating below a programmable threshold.

15. The system of claim 11, wherein the monitoring bot is configured to interact with a data jurisdiction bot to establish controls to protect the interests of the user with respect to the user data.

16. A non-transitory computer-readable storage medium, the computer-readable storage medium including instructions that when executed by computers, cause the computers to perform operations of:
  receiving input from a user requesting monitoring of user data generated by activity of the user on an application or website;
  analyzing terms of service of the application or website where the user data is used or generated;
  programming a monitoring bot configured to monitor the user data based on the terms of service and the received input;
  encrypting the user data using the monitoring bot;
  tracking third-party attempt to access the user data using the monitoring bot and based on the terms of service;
  notifying the user regarding the tracked third-party attempt to access the encrypted data; and
  providing options to the user to monetize the tracked access to the user data.

17. The non-transitory computer-readable storage medium of claim 16, wherein the monitoring bot is configured to be replicated on multiple devices used by the user.

18. The non-transitory computer-readable storage medium of claim 17, wherein at least one of the multiple devices includes a smartphone.

19. The non-transitory computer-readable storage medium of claim 17, wherein at least one of the multiple devices includes a tablet.

20. The non-transitory computer-readable storage medium of claim 17, wherein at least one of the multiple devices includes a laptop.

* * * * *